United States Patent
Hall et al.

(10) Patent No.: US 6,661,348 B2
(45) Date of Patent: Dec. 9, 2003

(54) APPARATUS FOR PROVIDING A VISUAL INDICATION OF RECEIPT OF AN ELECTRONIC MESSAGE

(76) Inventors: Lance S. Hall, 2 Palmwood, Irvine, CA (US) 92618; Alfred E. Hall, 14943 Hillcrest Rd., Dallas, TX (US) 75248

(*) Notice: Subject to any disclaimer, the term of this patent is extended or adjusted under 35 U.S.C. 154(b) by 0 days.

(21) Appl. No.: 09/974,352

(22) Filed: Oct. 10, 2001

(65) Prior Publication Data

US 2003/0067395 A1 Apr. 10, 2003

(51) Int. Cl.7 .................................................. G08B 7/00
(52) U.S. Cl. ............................... 340/691.1; 340/691.6; 340/825.4; 340/825.36; 340/7.2; 340/7.55; 345/88; 345/169
(58) Field of Search .......................... 340/825.36, 7.2, 340/7.51, 7.55, 7.52, 7.56, 7.58, 7.43, 691.1, 691.6, 825.44, 825.37, 311.2, 825.4; 345/88, 169, 170

(56) References Cited

U.S. PATENT DOCUMENTS

| | | | | | |
|---|---|---|---|---|---|
| 4,656,469 | A | * | 4/1987 | Oliver et al. | 345/101 |
| 4,858,542 | A | * | 8/1989 | Kato et al. | 112/102.5 |
| 4,975,694 | A | * | 12/1990 | McLaughlin | 340/825.44 |
| 5,695,269 | A | * | 12/1997 | Lippmann et al. | 362/27 |
| 5,793,304 | A | * | 8/1998 | Sone | 340/825.44 |
| 6,115,023 | A | * | 9/2000 | Uchida | 345/114 |
| 6,152,880 | A | * | 11/2000 | Okada | 600/490 |

* cited by examiner

*Primary Examiner*—Jeffery Hofsass
*Assistant Examiner*—Daniel Prévil
(74) *Attorney, Agent, or Firm*—Alfred E. Hall

(57) ABSTRACT

Apparatus and method for providing a visual indication of receipt of an electronic message by changing the color of at least a portion of a display formed of liquid crystal according to the message received. A first circuit receives an incoming signal, a second circuit identifies the incoming signal by comparing the incoming signal with stored signals, and a third circuit causes a predetermined voltage to be coupled to a predetermined area of the liquid crystal to cause the predetermined area to assume a predetermined color to call attention to the incoming message.

15 Claims, 1 Drawing Sheet

APPARATUS FOR PROVIDING A VISUAL INDICATION OF RECEIPT OF AN ELECTRONIC MESSAGE

BACKGROUND OF THE INVENTION

1. Field of the Invention

The present invention relates in general to signal alerting apparatus and method and, in particular, to signal generating devices that produce alert signals such as incoming e-mail as well as stored event reminders, blood pressure, and the like including, but not limited to, hand-held computer operating systems and hardware such as PDA's, as well as cell phones, blood pressure monitors, and the like.

2. Description of Related Art

In U.S. patent application Ser. No. 09/707,623, filed Nov. 7, 2000, wherein one of the inventors herein is the inventor thereof, there is disclosed a dual time zone timepiece in which the LCD face of each timepiece changes from one color, such as a light color, to a darker color, when 12:00 noon is reached and which changes back to the light color LCD when the time reaches 12:00 midnight.

Further, in U.S. patent application Ser. No. 09/925,763, filed Aug. 9, 2001, a CIP application of application Ser. No. 09/707,623, and wherein the inventor thereof is one of the inventors herein, there is disclosed a timepiece in which the LCD display can be manually and selectively changed in color as desired by the user.

Many devices such as cell phones, PDA's (an acronym believed to represent "Personal Digital Assistant" and is defined as a "hand-held computer operating system and hardware" such as a PalmPilot™), pressure monitors, and the like, have an LCD display on which is presented information for the benefit of the user. For instance, cell phones display a symbol representing a message received and missed. When in meetings, the phone may be silenced or placed on low sound level conditions to allow an audible signal to be heard by the user but, hopefully, not by others in the meeting. PDA's can perform a large number of functions such as receiving radio frequency signals that contain various types of information intended for the benefit of the user such as e-mail and the like. In addition, the user may enter scheduled meeting times, birthdays, memo to send flowers, and the like that the user may access to be reminded of such events. Also, there are a large number of application specific devices such as blood pressure monitors that can be attached to the user and that give an indication of blood pressure. In all of these devices, the user is alerted either by an audible signal, which may interrupt important meetings, by a silent display, or simply by the user accessing the particular function to check on it, such as by visually checking a calendar.

It is well-known that nematic liquid crystals exist that change color when the voltage applied thereto is changed. In U.S. Pat. No. 4,656,469, there is disclosed an activated work using nematic liquid crystals that change color when the voltage applied thereto is changed.

It would be advantageous to have such a device in which the user could be notified of an incoming signal or stored event by a change in color of at least a portion of the LCD display thus providing a visual indication of the receipt of an e-mail, notification of a scheduled meeting, a birthday, a memo to send flowers, of blood pressure that exceeds a preset level, and a multitude of other reminders or notifications.

SUMMARY OF THE INVENTION

The present invention is intended to provide the user of a device having an LCD display with a novel visual notification of the receipt of any one of a plurality of electronic message signals. Such signals are intended to include, but are not limited to, incoming messages such as telephone calls and e-mail as well as stored event reminders, meeting schedules, blood pressure shown on an LCD monitor worn by the user that exceeds, or is less than, a predetermined level, an externally received signal that has passed through a demodulating or other signal detecting electronic device, notification of a FAX message received, back-up data warning, and other messages. As used herein, the term "electronic message" or "message signals" is intended to mean any data presented on an LCD display as a result of an externally received signal or a stored signal. An example would be a signal representing the receipt of a telephone message that is illustrated by specific indicia appearing on the LCD display. The received signal could enter the device as radio frequency signals, infra-red signals, keyboard signals to be stored, light guides, pulse or blood pressure monitors worn on the body of the user, and the like. The received signals are then processed by the device and an a special output signal is then generated to visually indicate the type of signal being received by changing the color of at least a portion of the LCD display.

In the present invention, the LCD of the device, or at least a portion thereof, is changed in color to indicate to the user the presence of the signal received. Either the entire LCD or a portion thereof could be changed in color. As an example, if an e-mail is being or has been received, the entire LCD could change from its normal color to a red color or other available color. As an optional choice, a portion of the LCD, such as a square, a triangle, or other indicia, would change color to indicate the receipt of such signal. As indicated earlier, the device could be any signal receiving device that receives at least one message signal. Such device could be a PDA, a cell phone, an application specific device such as an LCD blood pressure monitor worn by the user, a depth pressure monitor for divers, a time-remaining-below-surface monitor for divers, LCD display of oxygen remaining in a tank, or other like device.

Thus, it is an object of the present invention to provide an apparatus for presenting a visual indication of receipt of an electronic message by changing the color of at least a portion of the LCD display forming a part of the apparatus.

Therefore, the invention relates to apparatus for providing a visual indication of receipt of an electronic message comprising an LCD display forming a part of the apparatus; a first circuit for receiving at least one of a plurality of message signals; a second circuit coupled to the first circuit for recognizing a particular received message signal; and a third circuit coupled between the second circuit and the LCD display for causing at least a portion of the LCD display to change color according to the particular message signal received.

The invention also relates to a method of providing a visual indication of receipt of an electronic message with an apparatus having an LCD display comprising the steps of receiving at least one of a plurality of message signals, recognizing the received message signal; and causing at least a portion of the LCD display to change color according to the recognized message signal received.

BRIEF DESCRIPTION OF THE DRAWINGS

These and other objects of the present invention will be more fully described in the following detailed description of the drawings, in which like numerals represent like elements, and in which.

DETAILED DESCRIPTION OF THE DRAWINGS

Figure 1:
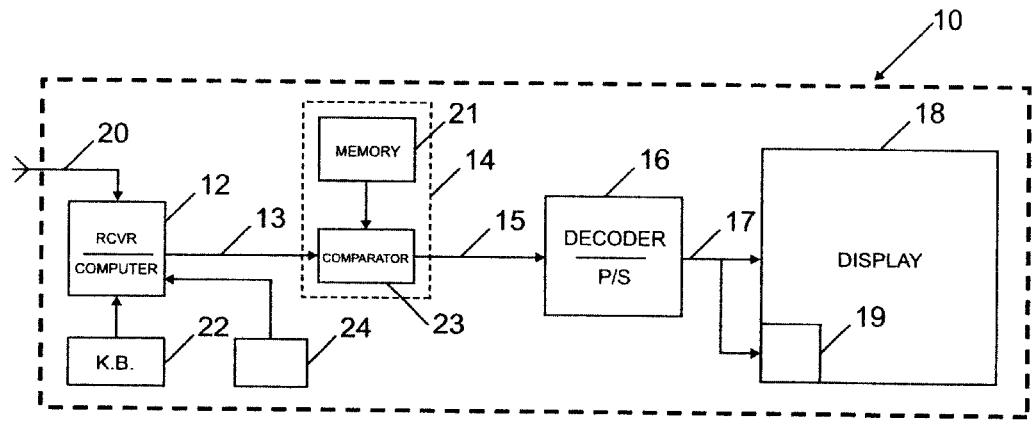
FIG. 1 is an electronic diagram of a novel apparatus forming the present invention.

FIG. 1 is an electronic diagram representing the novel apparatus of the present invention. The apparatus 10 could be any one of several devices such as a PDA (a handheld computer operating system and hardware), a cell phone, or an application specific device such as any type of LCD pressure monitor such as blood pressure monitor worn by the user, oxygen remaining LCD monitor, time-remaining-below-surface LCD display for divers, for example only.

The apparatus 10 comprises a first circuit 12 which may be a radio signal receiving circuit that receives and demodulates electronically transmitted signals that could be received through antenna 20 and generates a particular output signal on line 13 that represents, or is indicative of, the received signal. It maybe of any type of well-known output signal such as a coded signal or a special computer generated signal. This particular signal on line 13 is coupled to second circuit 14 that recognizes the particular signal on line 13 and generates an output signal on line 15 to a third circuit 16 that is coupled to the display 18 and that causes at least a portion of the LCD display 18 to change color according to the particular message signal received.

First circuit 12 could also be a well-known computer circuit that receives data signals from a keyboard 22 such as meeting dates, birthdays, memos and the like. The computer 12 has well-known software functions that decode such inputs from the keyboard and generates an output signal on line 13 that represents the particular signal input from the keyboard. First circuit 12 could also receive from input 24 any type of input signal such as infrared signals, light guide signals, blood pressure signals, and the like that are well-known in the art. In each case, the first circuit 12 outputs a particular signal on line 13 representing the signal received or input to the first circuit 12.

The output signal on line 13 is coupled to a second circuit 14 for recognizing a particular message signal on line 13. Second circuit 14 comprises a memory 21 that has stored therein, in any well-known manner, data representing any-one of the multiplicity of message signals that could be received by the apparatus. Comparator 23 receives the input message signal on line 13 and compares it, in a well-known manner, with the data stored in memory 21. If a match is found, the comparator outputs a signal on line 15 that represents the particular message signal received. Obviously, second circuit 14 could include at least one software program that compares the message signal on line 13 with the stored data and outputs a coded signal on line 15 that represents the particular message signal on line 13.

Third circuit 16 is coupled between the second circuit 14 and the display 18 and generates a signal on line 17 that causes at least a portion of the LCD display 18 to change color according to the particular message signal received. As an example, at least a portion 19 of the LCD display 18 could be caused to change to the color red when a telephone message is received. Third circuit 16, as will be discussed in detail hereafter, includes a power supply 28 whose output voltage applied to the LCD display 18 or portion 19 thereof can be changed to cause the color of the LCD display 18 or portion 19 thereof to change color as indicated earlier.

Figure 2:
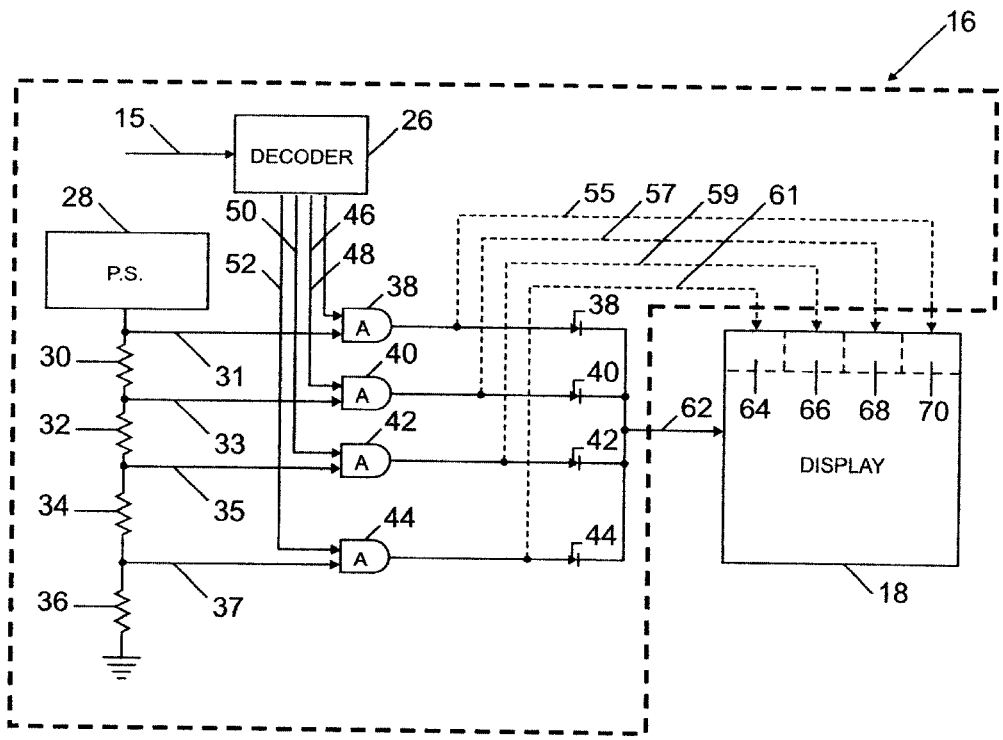
FIG. 2 is an electronic diagram of the decoder/power supply circuit of FIG. 1.

FIG. 2 is a diagrammatic representation of the third circuit 16 shown in FIG. 1 that can cause the voltage applied to the LCD display 18 to change in accordance with the message signal received on line 13 and recognized by second circuit 14. The third circuit 16 includes a power supply 28 that generates multiple output voltages. These multiple voltages can be produced with well-known software programs or by using apparatus such as a series connected string of resistors 30, 32, 34, and 36 wherein the resistors have a value so as to produce a particular output voltage across that resistor. As an example, the power supply may generate 5 volts that is available on line 31. Four (4) volts may be available on line 33, three (3) volts on line 35, and two (2) volts on line 37. As stated, these are examples only and any needed values of resistance could be used to generate any desired voltage.

The signal on line 15 that represents the particular message signal received is coupled to a decoder 26 of any well-known type including a software decoder. The message signal on line 15 may, for instance, be a coded signal representing the particular message signal received. It is coupled to any well-known decoder circuit such as a binary decoder, a decade decoder, or a decoder operated by a software decoding program. The outputs from the decoder on lines 46, 48, 50, and 52 vary depending on the particular message received. Again, as an example only, a message signal representing a received radio frequency message may cause a signal to be generated on line 46. This signal is coupled to an AND gate 38 to enable a 5 volt signal to be coupled to the display 18 through isolating diode 54 and on line 62. This voltage would cause the LCD display 18 to assume any desired available color such as red or green.

In like manner, again as an example only, a message signal representing an e-mail received may cause an output on line 48 that is coupled to AND gate 40 to enable a 4 volt signal to be coupled through isolation diode 56 on line 62 to the LCD display 18 to cause it to change to a different color that represents e-mail messages.

A signal on line 50 would be coupled to AND gate 42 to enable 3 volts to be coupled to the LCD display 18 through isolation diode 58 and line 62 to change the LCD display to a different color representing a different received message signal such as a meeting reminder.

A signal on line 52 would be coupled to AND gate 44 to enable 2 volts to be coupled to the LCD display 18 through isolation diode 60 and line 62 to change the LCD display to another color representing yet another different received message signal such as a birthday reminder.

If it is desired to change the color of only a portion of the LCD display 18, the outputs from the AND gates 38, 40, 42, and 44 could be coupled through phantom lines 55, 57,59, and 61 to activate a particular area of the LCD display. As an example, the output of AND gate 38 could be coupled only to area 70 of display 18 to change the color of only area 70 when a decoded signal is generated on line 46. The output of AND gate 40 may be coupled on phantom line 57 only to area 68 of display 18 to change only that area color when a decoded signal is generated on line 48. Obviously, the outputs of AND gates 42 and 44 could be coupled on respective phantom lines 59 and 61 may be coupled to respective areas 64 and 66 of the LCD display 18 to cause the color of those areas to change according to the particular message signal received.

The method of the present invention comprises the steps of forming an LCD display 18 as part of the apparatus, receiving any one of a plurality of message signals in a first circuit 12, recognizing a particular message signal received with a second circuit 14, and causing at least a portion 19 of an LCD display 18 to change color by means of a third circuit according to the particular message signal received.

Thus, there has been disclosed a novel apparatus and method for providing a visual indication of receipt of a particular message signal by causing at least a portion of the LCD display to change to a particular color according to the particular message signal received.

What is claimed is:

1. Apparatus for providing a visual indication of receipt of at least one of a plurality of electronic message signals to a user thereof comprising:
   a liquid crystal forming a visual display as part of said apparatus;
   a first circuit for receiving said at least one of said plurality of message signals;
   a second circuit coupled to said first circuit for recognizing a particular received message signal;
   a third circuit coupled between said second circuit and said visual display for causing at least a portion of said liquid crystal to change color according to the particular message received and comprising;
      a power supply for generating multiple output voltages; and
      a device for receiving said particular message signal and generating one or more output signals that cause at least one of said multiple output voltages from said power supply to be coupled to at least a portion of said liquid crystal to change its color thereby silently but visually notifying the user of said apparatus of the receipt of said particular message.

2. The apparatus of claim 1 wherein said second circuit comprises:
   a memory for storing data representing a plurality of message signals; and
   a comparator coupled to said first circuit and to said memory for generating an output signal when said received particular message signal compares with at least one of said stored data message signals.

3. The apparatus of claim 2 wherein said output signal from said comparator is a coded signal.

4. The apparatus of claim 2 wherein said first circuit is a radio frequency signal receiving circuit that receives and demodulates electronically transmitted signals.

5. The apparatus of claim 3 wherein said device comprises:
   a decoder for receiving and decoding said coded signal and generating one or more output signals according to said coded signal;
   a plurality of gate means, each gate means receiving one of said multiple power supply output voltages as one input and one of said decoder signals as another input; and
   an output from each of said gate means being coupled to at least a portion of said liquid crystal according to said code representing said particular message.

6. The apparatus of claim 5 wherein each said output of each of said gate means is coupled to said liquid crystal thereby causing said liquid crystal to display a different color for each gate means output.

7. The apparatus of claim 5 wherein each said output of each of said gate means is coupled to a different portion of said liquid crystal thereby causing each said different portion of said liquid crystal to change color to a particular color only.

8. The apparatus of claim 1 wherein said apparatus is a hand-held computer operating system and hardware including a PDA.

9. The apparatus of claim 8 wherein said received message represents an e-mail message that has been received by said apparatus.

10. The apparatus of claim 1 wherein said apparatus is a cell-phone.

11. The apparatus of claim 10 wherein said received message represents a phone call that has been received by said apparatus.

12. The apparatus of claim 1 wherein said received message represents a blood pressure warning to the user of said apparatus.

13. The apparatus of claim 1 wherein said message signal represents a stored meeting reminder.

14. A method for providing a visual indication of receipt of any one of a plurality of electronic message signals to a user of a visual display formed of liquid crystal and comprising the steps of:
   receiving at least one of a plurality of said message signals with a first circuit;
   recognizing the received message signal with a second circuit associated with the first circuit;
   providing multiple output voltages from a power supply; and
   receiving said recognized message signal with a device that generates one or more output signals that cause at least one of said multiple output voltages from said power supply to be coupled to at least a portion of said liquid crystal to change its color thereby silently but visually notifying the user of said apparatus of the receipt of said recognized message signal.

15. The method of claim 14 further including the step of causing the entire liquid crystal forming said display to change color according to the particular message signal received by means of said third circuit.

* * * * *